E. O. SCHWEITZER.
METHOD OF TESTING THE INSULATION OF GENERATORS IN SERVICE.
APPLICATION FILED MAY 24, 1917.

1,358,179.

Patented Nov. 9, 1920.

Witnesses
Charles V. Hildebrecht
John A. Dienner

Inventor
Edmund O. Schweitzer
By Brown, Hanson & Boettcher
Attorneys

E. O. SCHWEITZER.
METHOD OF TESTING THE INSULATION OF GENERATORS IN SERVICE.
APPLICATION FILED MAY 24, 1917.

1,358,179.

Patented Nov. 9, 1920.

UNITED STATES PATENT OFFICE.

EDMUND O. SCHWEITZER, OF CHICAGO, ILLINOIS.

METHOD OF TESTING THE INSULATION OF GENERATORS IN SERVICE.

1,358,179. Specification of Letters Patent. Patented Nov. 9, 1920.

Application filed May 24, 1917. Serial No. 170,585.

*To all whom it may concern:*

Be it known that I, EDMUND O. SCHWEITZER, a citizen of the United States, residing at Chicago, in the county of Cook and State of Illinois, have invented a certain new and useful Improvement in Methods of Testing the Insulation of Generators in Service, of which the following is a full, clear, concise, and exact description, reference being had to the accompanying drawings, forming a part of this specification.

My invention relates to a method of testing the insulation of an alternating current generator while the same is in service and more specifically is concerned with a method of making tests on the insulation of large turbo alternators or similar electrical units while the same are in normal operation and the insulation thereof subjected to the normal service stresses.

In operating generators of large capacity, particularly turbo alternators, such as are in use in central station generating plants at present, it is important to know at all times the condition of the various mechanical or electrical features so that upon the inception of a fault the unit may be taken out of active use and the fault corrected or the cause removed. The condition of the insulation on the windings of the large turbo generators used at present in central stations is one of the limiting features in their operation. Heretofore it has been impossible to gain any accurate knowledge of the condition of the insulation during operation of the machine. Consequently the central station operator has been in constant fear of failure of insulation and has been obliged to watch closely for the first sign of damage to the machine which heretofore has been the only way of gaining any definite knowledge of conditions. But waiting for a fault to develop far enough to cause damage is an unsatisfactory way of detecting the same because by the time the machine can be stopped or taken out of service serious and costly consequences may have been entailed.

I have conducted experiments which show conclusively that the insulation resistance of a generator changes under the stress of working conditions. It is very easy to measure the insulation resistance of a machine at rest, but such readings are of no practical value because that is not the condition under which the insulation breaks down. When the machine is running the insulation is under totally different conditions both with regard to the electro-static and electro-magnetic stresses and also with regard to atmospheric conditions and the like and insulation at this time is subject to service stresses of voltage, current, temperature, moisture and the like. I find that the resistance changes in a most decided manner under such working stresses. Such changes are wholly unforseeable by a simple potential test made under stand-still conditions.

My invention provides a method of and means for testing the insulation of generators and the like while the same are in normal service and providing an indication of any marked decrease in insulation resistance which would tend to indicate a dangerous condition. In the accompanying drawings I have illustrated the manner in which my invention may be carried out in practice. It will be apparent to those skilled in the art from the following description that the invention is not to be limited to use in connection with turbo alternators only but may be applied to other electrical machinery and devices.

Figure 1:
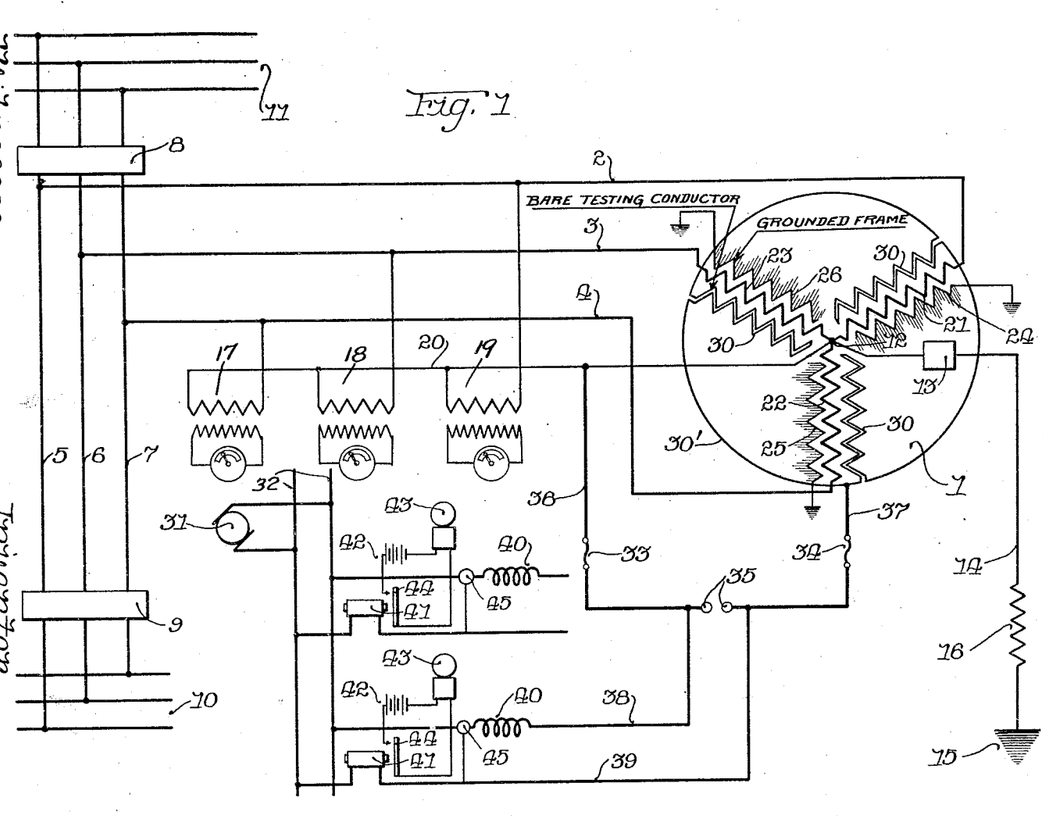
Figure 1 is a diagrammatic lay-out of the connection of a large turbo alternator with my invention applied thereto.

In Fig. 1 I have illustrated a three-phase turbo generator 1 connected by the leads 2, 3 and 4 to the generator buses 5, 6, and 7. These generator buses are connected through the oil switches 8 and 9 to the auxiliary buses 10 or to the main buses 11.

The generator 1 is a three-phase star connected alternating current machine having its neutral point 12 connected through the neutral oil switch 13 to the neutral bus 14 which is connected to ground, as shown at 15, through a limiting resistance of relatively small value, as shown at 16. The instrument potential transformers 17, 18 and 19 are connected between individual phases and the common neutral wire 20 so that each transformer is subjected to the full voltage of the corresponding phase.

The windings 21, 22 and 23 of the generator are disposed in slots lying in the face of the armature, these slots being formed in the laminations which form a part of the magnetic circuit of the machine and which laminations are suitably grounded through the machine. I have indicated the grounded character of the laminations and frame by the grounded conductors 24, 25 and 26 in Fig. 1.

Figure 3:
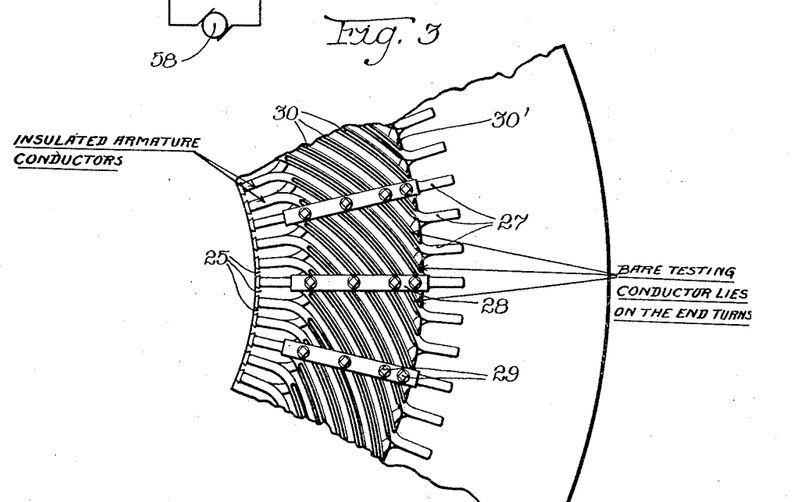
Fig. 3 is a fragmentary end elevation of the frame of a turbo alternator showing a part of the armature with the windings in place and showing also the exposed end turns and showing the exploring conductor in place.

The conductors lying in the slots of the armature are connected together by end turns 27, as shown in Fig. 3, these end turns being suitably formed as is understood in the art and being clamped together by means of the braces or clamps 28, as shown in Fig. 3. The clamps 28 are preferably formed of wood or other insulating material. They lie upon opposite sides of the end turns and are connected together by suitable bolts 29, as indicated in Fig. 3.

In accordance with my invention I provide conducting members which I term exploring conductors consisting either of small bare copper wires or small bare strips folded together in non-inductive relation, and a conducting member of this character is laid upon each exposed end turn as is indicated at 30 in Fig. 3. These conducting members are all connected together in a closed loop as is indicated by the circular connection 30' in Fig. 1. It is to be understood that the specific manner of placing of these conducting members upon the end turns is not of the essence of the invention. It is desirable only that these conducting members lie upon the surface of the end turns in close contact therewith and be distributed fairly uniformly so as to give a representative test of the end turns as well as the rest of the insulation. In accordance with my invention I provide a small direct current generator 31 which generates a constant voltage of 1000 volts. This generator is connected to the DC testing buses 32 for supplying testing current for a number of generators, each of which may be like the one illustrated in Fig. 1. The testing buses are connected to the neutral wire 20 and to the wire 30' of the exploring conductors 30 so as to place a difference of potential between the copper of the machine and the exploring conductor 30 which I have described.

The leads 36 and 37 are made of relatively large current carrying capacity and heat radiating capacity and are provided with fuses 33 and 34 of relatively low carrying capacity to shut off any dynamic flow of current which might be caused upon failure or partial failure of the insulation. A spark gap 35 is abridged across the leads 36 and 37 for discharging any "static" which accumulates. The leads 38 and 39 connect the DC buses 32 with the leads 36 and 37. An inductance 40 is included in series with these leads and a series of relay 41 is also included in series in the leads 38, 39. The relay 41 controls a local alarm circuit containing a signal or indicator 43, this circuit 42 being normally open at the armature 44 except when the current in the leads 38, 39 rises to such an extent as to indicate a serious drop in insulation resistance. The relay 41 is provided with adjustments not shown so that the local circuit 42 will be closed at any desired value as is well understood by those skilled in the art. A megohm meter 45 is connected to the leads 38 and 39 so that the insulation resistance may be measured to indicate the condition of the insulation.

The operation of the system thus far described and the method of testing is as follows:

The DC generator 31 is energized and connected to the leads 36, 37 before the generator 1 is excited. This places a unidirectional potential of 1000 volts between the copper of the machine and the conducting members 30 which overlie the end turns 27. The circuit for the flow of direct current is as follows: from the generator 31 over the buses 32, to the relay 41 in the lead 39, through the lead 37 to the conducting members 30, through the insulation to the copper of the coils and from the copper of the coils through the neutral wire at 20, either by way of the neutral point 12 or by way of the instrument potential transformers 17, 18 or 19 back over the leads 36, 38, through the inductance 40 to the generator 31. The megohm meter 45 indicates in megohms the insulation resistance of the generator.

After the DC generator 31 has been excited and connected, as above described, the alternator 1 is brought to the working potential and is put into service. I have found that the generator 1 when operating under service conditions with full voltage exhibits a lower insulation resistance than when the machine is not under voltage, this difference being very noticeable, even though the other conditions are kept constant. I have made experimental tests on an armature coil which was very dry with the voltage between phases varying from 6000 to 15,000 volts and under these conditions the insulation resistance decreased with an increase in voltage but the decrease was small. With 2000 megohms insulation resistance with no potential on the copper of the machine the resistance decreased to about 1850 or 1900 megohms with 15,000 volts between phases. The insulation on the coils under the conducting member or exploring conductor 30 was then moistened until the insulation resistance was reduced to 800 megohms with no pressure on the coils. A series of measurements were made with the coils in this condition and it was found that insulation resistance was lower at 15,000 volts on the copper by 250 megohms than it was with no voltage on. The values obtained in this experiment were duplicated under the same conditions thirty minutes later.

It is important, as I have found by experiment to apply the testing voltage from the DC generator 31 before the alternator 1 is excited. If the alternator 1 is first excited and the generator 31 is then connected, the reading of the megohm meter 45 is disturbed by static electricity which causes this megohm meter to operate as an electrostatic volt meter and show a deflection on the indicator before the DC voltage 31 is applied.

The spark gap 35 has been bridged across the leads 38 and 39 for discharging the static which accumulates. I have found that the lower the insulation resistance, the greater and more violent is the static discharge at this gap. It may thus be seen that the static discharge from the exploring conductor, as above described, would in itself be a reasonably accurate measure of the insulation resistance of a generator winding.

The end turns of the generator winding are the part of the winding which is subjected to the greatest destructive action of vibration, condensation, windage, electrostatic strain, and in case of a short circuit on the winding it is the end turns which are subjected to the greatest electromagnetic and mechanical strain. Therefore the insulation on the end turns is a good point of application of the testing current to determine the condition of the insulation of the entire winding. However, in case of a weak point occurring in the insulation within the slot the measurement of the fault is not only the leakage surface over the coil to the fault but rather from the exploring winding over the surface of the insulation and through it to the core and from the core to the fault in the slot. Hence a fault occurring within the slot insulation would be measurable, and would give an indication of the lowered insulation resistance. It is to be noted, however, that the conductors within a slot are of substantially the same potential at any given time and hence there is very little tendency to rupture the insulation between conductors. The end turns of different slots overlap and are different in potential from each other to the full extent of the generator voltage.

Figure 2:
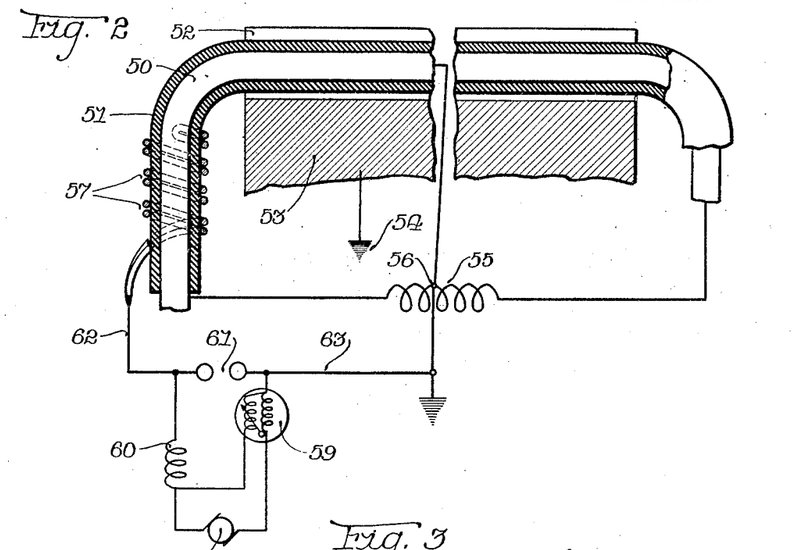
Fig. 2 is a simplified diagram of the method of testing according to my invention.

In Fig. 2 I have illustrated a simplified diagram of a single phase scheme of testing. In this case an insulated generator conductor 50 which has the insulation 51 lies in the slot 52 of the armature 53. The armature 53 is grounded, as indicated at 54. The opposite ends of the conductor 50 are connected together through an artificial load 55 to provide a neutral point 56 which is grounded. The exploring conductor 57 is wrapped non-inductively on one of the end turns of the conductor 50. It is to be understood, of course, that either one, or both end turns are thus provided with an exploring conductor as desired.

The DC generator 58 which maintains a constant potential of 1000 volts or any predetermined value is connected by the leads 62 and 63 to the exploring conductor 57 and to the neutral point 56 which is grounded as indicated. The spark gap 61 is bridged across these leads to discharge the accumulated static. The inductance 60 insures the discharge of the static across the gap 61 rather than through the generator 58 and the megohm meter 59. The megohm meter may be relied upon to provide a suitable indication of the insulation resistance value or a relay such as the relay 41 may be provided, if desired.

Figure 4:
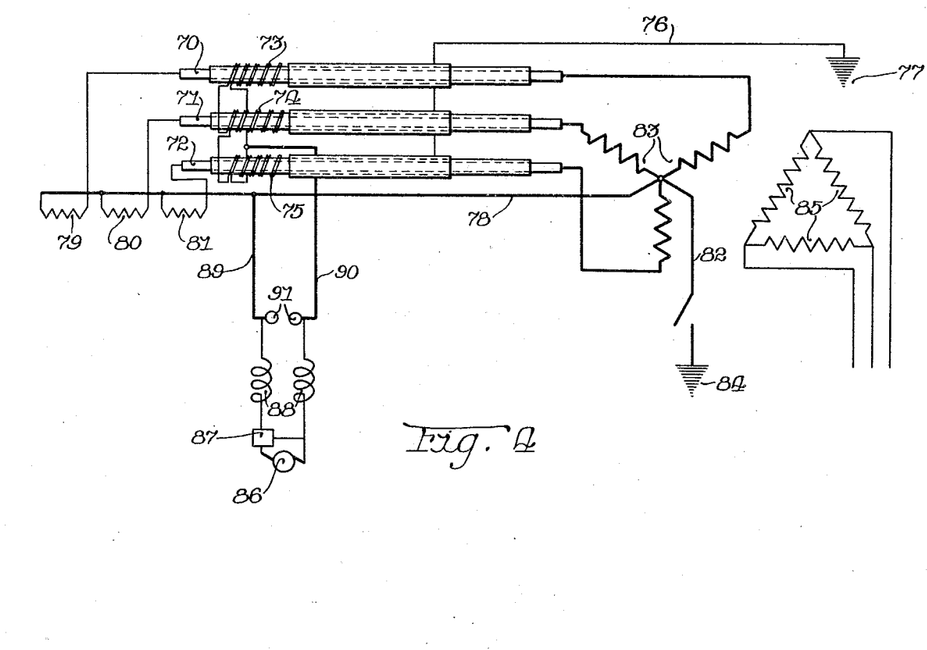
Fig. 4 is a diagram illustrating the manner in which a test may be carried out on any type of three-phase alternating current machinery.

Fig. 4 indicates in general the scheme for making a test on any piece of three-phase alternating current apparatus. Assume that the conductors 70, 71 and 72 form part of a three-phase unit, the insulation resistance of which it is desired to test. The exploring conductor in this case comprises a closed loop of wire which is wound in non-inductive loops 73, 74, and 75 upon the exposed part or parts of the conductors 70, 71 and 72. The frame of the machine is represented by the grounded conductors 76 which inclose or come in contact with the insulation of the conductors 70, 71 and 72. This frame is grounded as shown at 77. An artificial neutral 78 is created by means of the artificial load consisting of the inductive windings 79, 80 and 81, these windings corresponding to the instrument transformers shown in Fig. 1. The means for exciting the conductors 70, 71 and 72 is shown as a three-phase Y connected winding 83, the neutral point of which is connected to the neutral wire 82 and to the neutral point 78. This neutral is grounded, as is shown at 84. The winding 83 may be that of a generator in which the excitation is caused by the field or it might consist of a winding influence by another stationary winding such as 85, as for instance where the windings 83 and 85 are transformer windings. The DC generator 86 is connected through the megohm meter 87 and the inductances 88 to the leads 89 and 90, having the spark gap 91 bridged across them. These leads are in turn connected to the exploring conductor consisting of the loops 73, 74 and 75 and to the neutral wire 78 which is grounded.

From the foregoing it can be seen that my invention provides means for making a test of any single-phase or poly-phase apparatus while the same is subject to the service potentials and stresses so that a reliable indication may at all times be afforded of the insulation resistance value and consequently of the condition of the insulation of the device or machine which is under test.

I do not intend to be limited to the precise details of arrangement or to the connections shown as it is apparent that my invention may be applied in other ways and under other conditions. I am the first, however, to provide means for indicating the condition of the insulation of a turbo-alternator, or the like, while the same is in actual service and subjected to the service potential and service stresses. I intend that the following claims be construed in the light of the basic nature of this invention.

I claim:

1. In combination, a generator having an armature, an insulated working conductor wound on the armature, said conductor having exposed end turns, an exploring conductor lying in contact with the outer surface of the insulation along the end turns of said conductor, said exploring conductor being insulated from the working conductor by the insulation of said working conductor and connected to ground through an indicating device, and means to apply a difference of potential between the armature conductor and said exploring conductor.

2. In combination, an electro-magnetic device having a magnetic member, an insulated electric working winding on the magnetic member having projecting portions, a testing conductor lying on the insulation of one of said projecting portions, said testing conductor being insulated from direct connection to the magnetic member and being connected to the winding through an indicating device.

3. In combination, an electro-magnetic device having a magnetic member, an insulated working winding on the magnetic member having projecting portions, a testing conductor lying on the insulation of one of said projecting portions, said testing conductor being insulated from the magnetic member and being connected to winding through an indicating device and means for applying a testing potential between the magnetic member and the testing conductor.

4. In combination, an electro-magnetic device having a magnetic member, an insulated working winding on the magnetic member, said winding having projecting portions, a testing conductor lying on the insulation of one of said projecting portions, said testing conductor being insulated from the magnetic member and a spark gap bridged across the testing conductor and the winding.

5. In combination, an electro-magnetic device having a magnetic member, an insulated working conductor forming a winding on the magnetic member, said winding having projecting portions, a testing conductor lying on the insulation of one of said projecting portions, said testing conductor being insulated from the magnetic member, and means for indicating the leakage between the test conductor and the conductor of the winding while said electro-magnetic device is subject to normal potential.

6. In combination, an electro-magnetic device having a magnetic member, an insulated working conductor forming a winding on the magnetic member, said winding having projecting portions, a testing conductor lying on the insulation of one of said projecting portions, said testing conductor being insulated from the magnetic member, and means for applying a testing potential between the magnetic member and the testing conductor.

7. In combination, an electro-magnetic device having a magnetic member, an insulated working electrical conductor forming a winding on the magnetic member, said winding having projecting portions and having a neutral point, a testing conductor lying on the insulation of one of said projecting portions, said testing conductor being insulated from the magnetic member and from the winding, a connection between the neutral point of the winding and the magnetic member and means for indicating the condition of the insulation of the winding, said means being connected to the test conductor and the neutral point of the winding.

8. The method of determining under normal running potential the condition of the insulation of an electro-magnetic device having a winding with projecting end turns, which comprises paralleling the end turns with a bare exploring conductor brought into intimate contact with the insulation on the end turns, and measuring the insulation of the end turns, by measuring the resistance between a neutral point in the winding and the said conductor.

9. The method of determining the condition under normal running potential of an electro-magnetic device having an insulated winding with exposed end turns which comprises applying to the insulation about the end turns a bare exploring conductor, and impressing a uni-directional testing potential upon opposite surfaces of the insulation upon the end turns in such a way as to place it in a neutral bridge with respect to opposing operating potentials of the device, and measuring the leakage through or over the surface of said insulation between the conductors of the winding and the exploring conductor.

10. In an electro-magnetic device, a magnetic member, a working winding on the magnetic member having projecting end turns, said winding being provided with insulation throughout its length, and means mounted on the end turns for indicating the leakage of current through the insulation of the end turns while the winding is subjected to normal service voltage.

11. In an electro-magnetic device, a grounded magnetic member, a winding of insulated working conductors over said magnetic member, the neutral point of said winding being grounded, said winding having connecting conductors out of contact with the magnetic member, a testing conductor insulated from the winding and from the magnetic member lying on the extending conductors, an artificial load connected between the neutral point and a terminal of said winding, and means for indicating the condition of the insulation of the winding said means being connected between the testing conductor and the neutral point.

12. In combination, an insulated working conductor having a sheath of insulation, an exploring conductor lying in contact with the outer surface of the insulation along a part of its length, a second conducting member lying in contact with a different part of the surface of the insulation, and means to apply a difference of potential between said exploring conductor and said conducting member, said exploring conductor being insulated from said second conducting member.

13. In an electro-magnetic machine, a frame member, a working conductor supported on the frame member and having a part projecting from said frame, a sheath of insulation surrounding said conductor and interposed between the conductor and the frame, an exploring conductor lying over the outer surface of the sheath of the conductor at the projecting part, and means to apply a difference of potential between said exploring conductor and said frame, said exploring conductor being insulated from the frame member and from said other conductor.

14. In an electro-magnetic machine, a frame member, a working conductor supported on the frame member and having a part projecting from said frame, a sheath of insulation surrounding said conductor and interposed between the conductor and the frame, an exploring conductor lying over the outer surface of the sheath of the conductor at the projecting part, and means to apply a difference of potential between said exploring conductor and said frame, and indicating means for indicating the flow of current from said exploring conductor.

15. In combination, an alternating current generator, having insulated working conductors with end turns, an exploring conductor lying against the insulation of the end turns, an inductance connected to said exploring conductor, and a source of direct current connected through said inductance to said working conductors and to said exploring conductor.

16. In combination, an alternating current generator, having insulated working conductors with insulated end turns, an exploring conductor lying against the insulation of the end turns, an inductance connected to said exploring conductor, and a source of direct current connected through said inductance to said working conductors and to said exploring conductor, and an indicator serially connected with the said inductance and the said source of direct current for indicating the condition of the insulation on said generator working conductors.

17. In combination, an alternating current generator, having insulated working conductors with end turns, an exploring conductor lying against the insulation of the end turns, an inductance connected to said exploring conductor, a source of direct current connected through said inductance to said working conductors and to said exploring conductor, and a spark gap bridged across the direct current leads.

18. In combination with a generator and transmission system, a point therein of neutral potential, an insulated winding, a plurality of test points for the said winding located equi-potentially of the said neutral point, conducting members over the winding insulation at the said points, and testing means including a source of direct current and an electro-responsive device quantitatively responsive to the flow of direct current, connected between the said neutral point and the said conducting members electrically connected together.

19. In combination with a generator and transmission system, a point therein of neutral potential, an insulated winding, a plurality of test points for the said winding located equi-potentially of the said neutral point, conducting members over the winding insulation at the said points, and testing means including a source of direct current and an electro-responsive device quantitatively responsive to the flow of direct current, connected between the said neutral point and the said conducting members electrically connected together, and alternating current limiting circuit connections for the said testing means.

20. In an electrical unit, a frame member, insulated working conductors supported on said frame member, an exploring conductor covering an exposed part of the insulation of said insulated conductor, a source of direct current connected to said exploring conductor, an indicator in series with said source of direct current for indicating the condition of the insulation, an inductance in series with said source of direct current, and a spark gap bridged across the direct current leads.

21. The method of testing the insulation on the conductors of an alternating current generator or the like while the same is in use, which consists in covering a part of the insulation of the end turns with an exploring coil then applying a unidirectional difference of potential to the conductors and to the exploring conductor, and causing the current flowing to give an indication of the condition of the insulation resistance.

22. The method of testing the insulation on the conductors of an alternating current generator or the like while the same is in operation which consists in covering a part of the end turns with an exploring conductor, then applying a uni-directional difference of potential to the exploring conductor and the conductors of the generator, then subjecting the conductors of the generator to the working potential and then causing the current flowing between the conductors of the generator and the exploring conductor to give an indication of the condition of the resistance.

23. In combination, an alternating current generator having a working conductor with an end turn, an exploring conductor clamped against the insulation of the end turn, and a megohm meter connected to the generator conductor and to the exploring conductor for indicating the condition of the resistance.

24. In combination, an alternating current generator having working conductors with end turns, a conducting member placed in non-inductive relation on said end turns, and a spark gap connected to the generator conductors and to the exploring conductor.

25. In combination, an alternating current generator having working conductors with end turns, an exploring conductor placed in non-inductive relation on said end turns, an inductance connected to said exploring conductor and a source of direct current connected to the working conductors and to the exploring conductor.

26. In combination, an alternating current generator having working conductors with end turns, clamps holding said end turns together, an exploring conductor placed in non-inductive relation on said end turns and being held in place under said clamps and a megohm meter connected to the exploring conductor and to the generator conductors.

27. In combination, a three-phase alternator having end turns, said alternator having its windings connected in Y with neutral point grounded, instrument potential transformers connected between the leads of the generator and said grounded neutral point, said transformers forming an artificial neutral, exploring conductors on said end turns, and a spark gap connected between said exploring conductors and said neutral.

28. In combination, a three-phase alternator having end turns, said alternators having its windings connected in Y with neutral point grounded, instrument potential transformers connected between the leads of the generator and said grounded neutral point, said transformers forming an artificial neutral, exploring conductors on said end turns, and a spark gap connected between said exploring conductors and said neutral, and a source of direct current with indicating means connected to said exploring conductor and to said neutral.

29. The method of testing an insulated coil structure, which consists in paralleling the end turns of the coil structure with a bare exploring conductor, and measuring the insulation resistance between said exploring conductor and the grounded machine neutral of said coil structure.

30. In combination, a coil structure comprising an insulated winding having an active inductor portion and an inactive portion adjacent the active portion, a bare exploring conductor laid in non-inductive loops upon the insulation of said inactive portion of the winding, means independent of the winding for applying a difference of potential between the exploring conductor and the conductors of the insulated winding, and means connected between the exploring conductor and the conductors of the winding for indicating the general condition of the insulation of said winding.

31. In combination with a power generating and transmission system, an alternating current generator, a generating winding therefor, a transmission line connected to the said winding, an external load for the said generator connected across the leads of the transmission line and having a neutral point, a circuit conductor for the said winding, insulating material covering the said conductor, an exploring conductor over limited portions only of the said conductor and in intimate contact with the said insulating material, testing means including a source of direct current connected to said neutral point, circuit conductors connecting the said source of direct current in a serial circuit including the said exploring conductor, the said circuit conductor, and the intervening insulating material, said serial circuit including a controlling element of a testing instrument quantitatively responsive to the flow of direct current over the said circuit while said alternating current generator is supplying alternating current to said load.

32. In combination with a power generating and transmission system, an alternating current generator, a generating winding therefor, a transmission line connected to the said winding, an external load for the said generator connected across the leads of the transmission line and having a grounded neutral, a circuit conductor for the said winding, insulating material covering the said conductor, an exploring conductor over limited portions only of the said conductor and in intimate contact with the said insulating material, testing means including a source of direct current connected to said grounded neutral, circuit conductors connecting the said source of direct current in a serial circuit including the said exploring conductor, the said circuit conductor, and the intervening insulating material, said serial circuit including a controlling element of a testing instrument quantitatively responsive to the flow of direct current over the said circuit while said alternating current generator is supplying alternating current to said load, and alternating current limiting circuit connections for the said testing means.

33. In combination with a power generating and transmission system, an alternating current generator, a generating winding therefor, a transmission line connected to the said winding, an external load for the said generator connected across the leads of the transmission line and providing a neutral point, a circuit conductor for the said winding, insulating material covering the said conductor, an exploring conductor over limited portions only of the said conductor and in intimate contact with the said insulating material, testing means including a source of direct current connected to said neutral point, circuit conductors connecting the said exploring conductor, the said circuit conductor, and the intervening insulating material, said serial circuit including a controlling element of a testing instrument quantitatively responsive to the flow of direct current over the said circuit, while the alternating current generator is supplying alternating current to said load, and a static current discharger bridged across the last named circuit conductors, being in multiple circuit with the said direct current source with its serially connected testing instrument.

34. In combination with a power generating and transmission system, an alternating current generator, a generating winding therefor, a transmission line connected to the said winding, an external load for the said generator connected across the leads of the transmission line and providing a neutral point, a circuit conductor for the said winding, insulating material covering the said conductor, a neutral point for the said winding dividing the winding into equi-potential portions, a common connection for said neutral point, exploring conductors over different limited portions of the said winding conductor, said portions being equi-potentially distant from the said neutral point, said exploring conductors being connected together to bring them to substantially the same potential, said exploring conductors being in intimate contact with the said insulating material, testing means including a source of direct current connected to said common connection, circuit conductors connecting the said source of direct current in a serial circuit including the said exploring conductors, the said circuit conductor, and the intervening insulating material, said serial circuit including a controlling element of a testing instrument quantitatively responsive to the flow of direct current over the said circuit.

35. In combination with a power generating and transmission system, an alternating current generator, a generating winding therefor, a transmission line connected to the said winding, an external load for the said generator connected across the leads of the transmission line and providing a neutral point, a circuit conductor for the said winding, insulating material covering the said conductor, a neutral point for the said winding dividing the winding into equi-potential portions, a common connection for said neutral points, exploring conductors over different limited portions of the said winding conductor, said portions being equi-potentially distant from the said neutral point, said exploring conductors being connected together to bring them to substantially the same potential, said exploring conductors being in intimate contact with the said insulating material, testing means including a source of direct current connected to said common connection, circuit conductors connecting the said source of direct current in a serial circuit including the said exploring conductors, the said circuit conductor, and the intervening insulating material, said serial circuit including a controlling element of a testing instrument quantitatively responsive to the flow of direct current over the said circuit, and alternating current limiting circuit connections for the said testing means.

36. In combination with a power generating and transmission system, an alternating current generator, a generating winding therefor, a transmission line connected to the said winding, an external load for the said generator connected across the leads of the transmission line and providing a neutral point, a circuit conductor for the said winding, insulating material covering the said conductor, a neutral point for the said winding dividing the winding into equi-potential portions, a common connection for said neutral points, exploring conductors over different limited portions of the said winding conductor, said portions being equi-potentially distant from the said neutral point, said exploring conductors being connected together to bring them to substantially the same potential, said exploring conductors being in intimate contact with the said insulating material, testing means including a source of direct current connected to said common connection and in a serial circuit including the said exploring conductors, the said circuit conductor, and the intervening insulating material, said serial circuit including a controlling element of a testing instrument quantitatively responsive to the flow of direct current over the said circuit, and alternating current limiting means for the said testing means, and a static current discharger bridged across the last named circuit conductors, being in multiple circuit with the said direct current source with its serially connected instrument.

37. In combination with a power generating and transmission system, an alternating current generator, a generating winding therefor, a transmission line connected to the said winding, an external load for the said generator connected across the leads of the transmission line and providing a neutral point, a circuit conductor for the said winding, insulating material covering the said conductor, a neutral point in the power generating system which is equi-potentially distant from a plurality of points on the said generator winding conductor, a common connection for said neutral points, exploring conductors over the said plurality of conductor points, said exploring conductors being connected together to bring them to substantially the same potential, said exploring conductors being in intimate contact with the said insulating material, testing means including a source of direct current connected to said common connection, circuit conductors connecting the said source of direct current in a serial circuit including the said exploring conductors, the said circuit conductor, and the intervening insulating material, said serial circuit including a controlling element of a testing instrument quantitatively responsive to the flow of direct current over the said circuit.

38. In combination with a power generating transmission system, an alternating current generator, a generating winding therefor, a transmission line connected to the said winding, an external load for the said generator connected across the leads of the transmission line and providing a neutral point, a circuit conductor for the said winding, insulating material covering the said conductor, a neutral point in the power generating system which is equi-potentially distant from a plurality of points on the said generator winding conductor, a common connection for said neutral points, exploring conductors over the said plurality of conductor points, said exploring conductors being connected together to bring them to substantially the same potential, said exploring conductors being in intimate contact with the said insulating material, testing means including a source of direct current connected to said common connection, circuit conductors connecting the said source of direct current in a serial circuit including the said exploring conductors, the said circuit conductor, and the intervening insulating material, said serial circuit including a controlling element of a testing instrument quantitatively responsive to the flow of direct current over the said circuit, and alternating current limiting circuit connections for the said testing means.

39. In combination with a power generating and transmission system, an alternating current generator, a generating winding therefor, a transmission line connected to the said winding, an external load for the said generator connected across the leads of the transmission line and providing a neutral point, a circuit conductor for the said winding, insulating material covering the said conductor, a neutral point in the power generating system which is equi-potentially distant from a plurality of points on the said generator winding conductor, a common connection for said neutral points, exploring conductors over the said plurality of conductor points, said exploring conductors being connected together to bring them to substantially the same potential, said exploring conductors being in intimate contact with the the said insulating material, testing means including a source of direct current connected to said common connection, circuit conductors connecting the said source of direct current in a serial circuit including the said exploring conductors, the said circuit conductor, and the intervening insulating material, said serial circuit including a controlling element of a testing instrument quantitatively responsive to the flow of direct current over the said circuit, and a static current discharger bridged across the last named circuit conductors, being in multiple circuit with the said direct current source with its serially connected testing instrument.

40. The method of measuring the insulation about the winding of an alternating current power unit while the same is in use, consisting in clamping a test electrode against accessible portions of the winding and measuring with a "megger," the insulation resistance between the electrode and the neutral point of a balanced bridge of the winding conductors.

41. In combination with a current generator and transmission system, a point therein of neutral potential, an insulated winding, a plurality of test points for the said winding located equi-potentially of the said neutral point, exploring conductors over the winding insulation at the said points, and testing means including a source of direct current and an electro-responsive device quantitatively responsive to the flow of direct current, connected between the said neutral point and the said exploring conductors electrically connected together, and a static current discharger bridged across the last named circuit conductors, being in multiple circuit with the said direct current source with its serially connected testing instrument.

42. In combination with a current generator and transmission system, a point therein of neutral potential, an insulated winding, a plurality of test points for the said winding located equi-potentially of the said neutral point, exploring conductors over the winding insulation at the said points, and testing means including a source of direct current and an electro-responsive device quantitatively responsive to the flow of direct current, connected between the said neutral point and the said exploring conductors, and alternating current limiting circuit connections for the said testing means, and a static current discharger bridged across the last named circuit conductors, being in multiple circuit with the said direct current source with its serially connected testing instrument.

43. In an alternating current system an electromagnetic winding therefor, a transmission line connected to the said winding, an external load connected across the leads of the transmission line and providing a neutral point, a circuit conductor for the said winding, insulating material covering the said conductor, an exploring conductor over limited portions only of the said conductor and in intimate contact with the said insulating material, testing means including a source of testing current connected to said neutral point, circuit conductors connecting the said source of testing current in a serial circuit including the said exploring conductor, the said circuit conductor and the intervening insulating material, said serial circuit including a testing instrument quantitatively responsive to the flow of direct current over the said circuit.

44. In an alternating current system an electromagnetic winding therefor, a transmission line connected to the said winding, an external load connected across the leads of the transmission line and providing a neutral point, a circuit conductor for the said winding, insulating material covering the said conductor, an exploring conductor over limited portions only of the said conductor and in intimate contact with the said insulating material, testing means including a source of testing current connected to said neutral point, circuit conductors connecting the said source of testing current in a serial circuit including the said exploring conductor, the said circuit conductor, and the intervening insulating material, said serial circuit including a controlling element of a testing instrument quantitatively responsive to the flow of testing current over the said circuit, and alternating current limiting means for the said testing means.

45. In an alternating current system an electromagnetic winding therefor, a transmission line connected to the said winding, an external load connected across the leads of the transmission line and providing a neutral point, a circuit conductor for the said winding, insulating material covering the said conductor, an exploring conductor over limited portions only of the said conductor and in intimate contact with the said insulating material, testing means including a source of testing current connected to said neutral point, circuit conductors connecting the said source of testing current in a serial circuit including the said exploring conductor, the said circuit conductor, and the intervening insulating material, said serial circuit including a controlling element of a testing instrument quantitatively responsive to the flow of testing current over the said circuit, and a static current discharger bridged across the last named circuit conductors, being in multiple circuit with the said testing current source with its serially connected testing instrument.

46. In an alternating current system an electromagnetic winding therefor, a transmission line connected to the said winding, an external load connected across the leads of the transmission line and providing a neutral point, a circuit conductor for the said winding, insulating material covering the said conductor, a neutral point for the said winding dividing the winding into equi-potential portions, exploring conductors over different limited portions of the said winding conductor, said portions being equi-potentially distant from the said neutral point, said exploring conductors being connected together to bring them to substantially the same potential, said sheath conductors being in intimate contact with the said insulating material, testing means including a source of testing current connected to said neutral point, circuit conductors connecting the said source of testing current in a serial circuit including the said sheath conductors, the said circuit conductor, and the intervening insulating material, said serial circuit including a controlling element of a testing instrument quantitatively responsive to the flow of testing current over the said circuit.

47. In an alternating current system an electromagnetic winding therefor, a transmission line connected to the said winding, an external load connected across the leads of the transmission line and providing a neutral point, a circuit conductor for the said winding, insulating material covering the said conductor, a neutral point for the said winding dividing the winding into equipotential portions, a common connection for said neutral points, exploring conductors over different limited portions of the said winding conductor, said portions being equipotentially distant from the said neutral point connection, said exploring conductors being connected together to bring them to substantially the same potential, said exploring conductors being in intimate contact with the said insulating material, testing means including a source of testing current connected to said common connection in a serial circuit including the said exploring conductors, the said conductor, and the intervening insulating material, said serial circuit including a controlling element of a testing instrument quantitatively responsive to the flow of testing current over the said circuit, and alternating current limiting means for the said testing means, and a static current discharger bridged across the last named circuit conductors, being in multiple circuit with the said testing current source with its serially connected instrument.

48. In an alternating current system an electromagnetic winding therefor, a transmission line connected to the said winding, an external load connected across the leads of the transmission line and providing a neutral point, a circuit conductor for the said winding, insulating material covering the said conductor, a neutral point in the power generating system connected to said first neutral point said connection being equi-potentially distant from a plurality of points on the said generator winding conductor, exploring conductors over the said plurality of conductor points, said exploring conductors being connected together to bring them to substantially the same potential, said exploring conductors being in intimate contact with the said insulating material, testing means including a source of testing current connected to said neutral point, circuit conductors connecting the said source of testing current in a serial circuit including the said exploring conductors, the said circuit conductor, and the intervening insulating material, said serial circuit including a controlling element of a testing instrument quantitatively responsive to the flow of testing current over the said circuit.

49. In an alternating current system an electro-magnetic winding therefor, a transmission line connected to the said winding, an external load connected across the leads of the transmission line, a circuit conductor for the said winding, insulating material covering the said conductor, a neutral point in the power generating and transmission system which is equi-potentially distant from a plurality of points on the said generator winding conductor, exploring conductors over the said plurality of conductor points, said exploring conductors being connected together to bring them to substantially the same potential, said exploring conductors being in intimate contact with the said insulating material, testing means including a source of testing current connected to said neutral point, circuit conductors connecting the said source of testing current in a serial circuit including the said exploring conductors, the said circuit conductor, and the intervening insulating material, said serial circuit including a controlling element of a testing instrument quantitatively responsive to the flow of testing current over the said circuit, and alternating current limiting means for the said testing means.

50. The method of determining the insulation condition of an alternating current power system unit winding while the winding is in service, consisting in first applying electrically joined exploring conductors to a plurality of limited portions of the winding each of which is equi-potentially distant from a point of neutral potential, then in measuring the direct current resistance from the neutral point to the exploring conductors.

51. The method of measuring the insulation resistance, under normal conditions of potential stress, of an electrical insulated winding included in an alternating current power system, consisting in covering a portion of the winding with an exploring conductor and then placing testing current, winding insulation, said exploring conductor and a testing instrument, in a phantom circuit of the system to eliminate the deleterious effect of alternating current system potentials.

52. The method of determininig under normal operating conditions of potential stress, the condition of insulation about a winding conductor of an alternating current power unit, consisting in placing a plurality of electrically joined exploring conductors about different limited portions of the insulated winding which are of equal potential with reference to a common point, and of measuring the direct current resistance between the common point and the joined exploring conductors.

53. The method of measuring under normal conditions of working potential stress, the insulation resistance of a winding in an alternating current power system, consisting in first connecting a resistance measuring means to a conductor of the system and to an exploring conductor intermediately associated with the winding insulation, and then putting the winding in operation so as to subject it to normal operating potential stress.

54. The method of testing the insulation on the working conductors of a winding included in an alternating current power system, while the same is in operative association with the system, consisting in covering a part of the end turns with an exploring conductor then applying a difference of potential to the exploring conductor and the conductors of the unit winding, then subjecting the conductors of the winding to their normal operating potential and then causing the current flowing between the conductors of the winding and the exploring conductor to give an indication of the condition of the insulation resistance.

55. The method of measuring the insulation resistance of active alternating system winding conductors consisting in applying an electrode to the insulation of a portion of the conductors and placing the resistance measuring means in a neutral branch of the alternating current system out of the path of the power alternating currents traversing the systems by including the insulation under the electrode which is measured.

56. In an electrical power system the combination with an electrical network of insulated circuit conductors, and electrical insulation testing means adapted to be included in a phantom circuit of the said network to test the insulation of the conductors thereof.

57. In an electrical power system, the combination with an electrical network of insulated circuit conductors, and electrical insulation testing means adapted to be included in a neutral branch of the said network to test the insulation of the conductors thereof.

58. In an electrical power system the combination with an electrical network of insulated circuit conductors, and electrical insulation testing means adapted to be included in a phantom circuit of the said network to test the insulation of the conductors thereof, said insulation being serially included in the said phantom circuit.

59. In an electrical power system, the combination with an electrical network of insulated circuit conductors, and electrical insulation testing means adapted to be included in a neutral branch of the said network to test the insulation of the conductors thereof, said insulation being serially included in said neutral branch with the said insulation testing means.

60. In an electrical power system the combination with an electrical network comprising insulated winding circuit conductors, an electrical insulation testing means for testing the insulation of a portion only of the said conductors said testing means adapted to be included in a branch of the said network together with the said insulation to be tested, the said insulation and the said testing means being in serial circuit with each other, and power system current limiting means for the said branch circuit to prevent the said power current from interfering with the proper operation of the said testing means.

61. In an alternating current electrical power system the combination with an electrical network of insulated circuit conductors, a direct current electrical insulation testing means for testing the insulation of a portion only of the said conductors said testing means adapted to be included in a branch of the said network together with the said insulation to be tested, the said insulation and the said testing means being in serial circuit with each other, and power system current limiting inductance means for the said branch circuit to prevent the said power current from interfering with the proper operation of the said testing means.

In witness whereof I hereunto subscribe my name this 22nd day of May, 1917.

EDMUND O. SCHWEITZER.